G. A. LUTZ.
CONNECTOR FOR CONDUITS AND PIPES.
APPLICATION FILED SEPT. 23, 1909.
1,028,579.
Patented June 4, 1912.
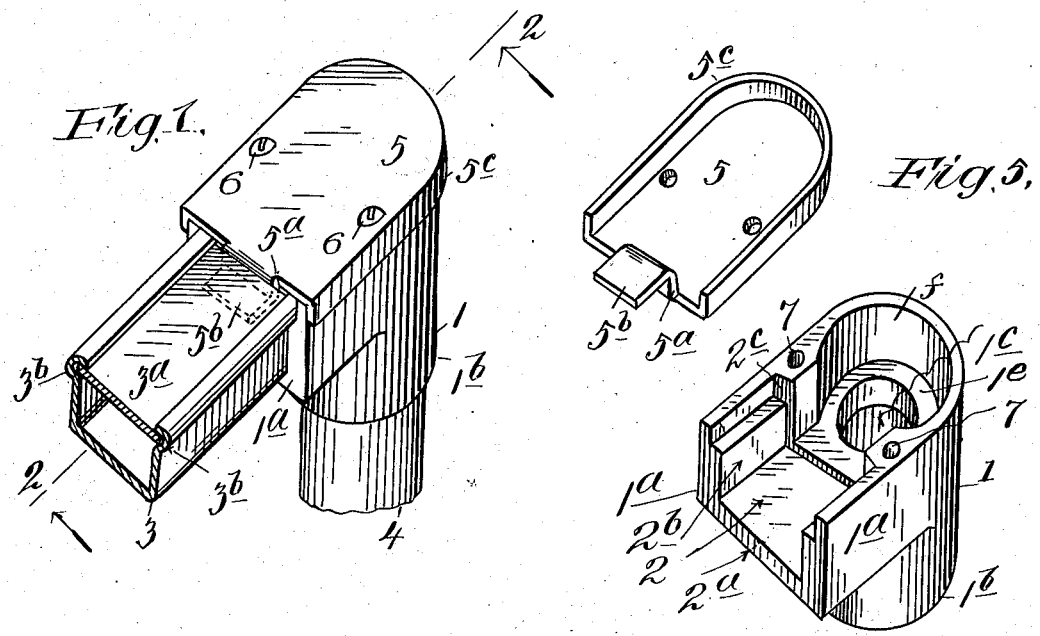
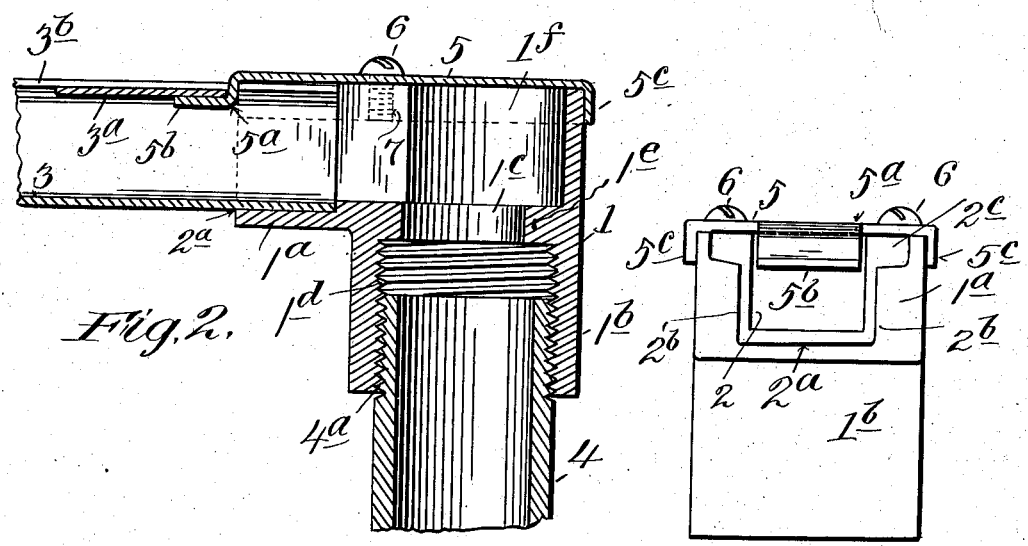
Witnesses:
Inventor
Geo. A. Lutz
By his Attorney

UNITED STATES PATENT OFFICE.

GEORGE A. LUTZ, OF PLAINFIELD, NEW JERSEY.

CONNECTOR FOR CONDUITS AND PIPES.

1,028,579.  Specification of Letters Patent.  Patented June 4, 1912.

Application filed September 23, 1909. Serial No. 519,192.

*To all whom it may concern:*

Be it known that I, GEORGE A. LUTZ, a citizen of the United States, and resident of Plainfield, in the county of Union and State of New Jersey, have invented certain new and useful Improvements in Connectors for Conduits and Pipes, of which the following is a specification.

The object of my invention is to provide improved means for connecting conduits, of the class having one side open and provided with a removable cover, with pipes at the corners or junctions of such conduits and pipes where they extend at an angle to each other.

The invention comprises a connector made in angular form or having a plurality of branches at an angle to each other, one of which branches is provided with a socket adapted to receive a conduit of substantially angular form or one having one side open and provided with a removable cover, and the other branch is provided with internal screw threads adapted to receive the threads upon a pipe used as a conduit, to enable connection of a line of pipe to be made with such a conduit as described where they meet at an angle with respect to each other, whereby the contained conductor may be carried around a corner.

The invention also comprises the novel details of improvement and combinations of parts that will be more fully hereinafter set forth and then pointed out in the claims.

Reference is to be had to the accompanying drawings forming part hereof, wherein, Figure 1 is a perspective view illustrating my improvements; Fig. 2 is a section on the line 2, 2, in Fig. 1; Fig. 3 is an end view of the connector looking from the left in Fig. 2; Fig. 4 is a perspective view of the connector, its cap being removed, and Fig. 5 is a detail perspective of the underside of said cap.

Similar numerals of reference indicate corresponding parts in the several views.

The connector is shown generally at 1, and comprises a suitable piece of material such as cast metal, provided with a channel-like branch $1^a$ and a tubular branch $1^b$ communicating with each other through the chamber $1^c$. The branches $1^b$, $1^a$ are at an angle to each other, and are shown at a right angle with respect to each other. The branch $1^a$ is provided with a socket 2 adapted to receive a conduit 3. Socket 2 is open on one side and one end, and in the example illustrated the open side of socket 2 extends upwardly or outwardly in a direction parallel to the bore of branch $1^b$, while the open end of socket 2 extends in a direction at an angle to the bore of branch $1^b$ to receive conduit 3. The conduit 3 I have shown is of channel form having one side open and provided with a removable cover $3^a$. In the particular form of conduit illustrated the same is provided with opposed curved portions $3^b$ receiving cover $3^a$, and in the particular form of socket 2 illustrated the same is provided with a bottom wall $2^a$, side walls $2^b$ at an angle to the bottom wall, and offset recesses $2^c$, the conduit 3 being set in socket 2 and the extending portions $3^b$ of the conduit entering the recesses $2^c$. The branch $1^b$ of the connector is provided with internal threads $1^d$ receiving external threads $4^a$ upon pipe 4, and at $1^e$ is a shoulder or seat within the connector serving as an abutment to prevent pipe 4 from being screwed too far into the hollow portion $1^f$ of the connector. At 5 is a cap or cover secured upon the connector to cover socket 2 and hollow portion $1^f$ of the connector, which cap is shown held in place by screws 6 passing through holes in the cap and entering threaded holes 7 in the connector. Cap 5 is shown provided with a lug $5^a$ projecting in the direction of socket 2 to limit the sliding of cover $3^a$ toward the connector 1. Lug $5^a$ is shown provided with an extension $5^b$ projecting outwardly under cover $3^a$, see Fig. 2. Cap 5 is also shown provided with a flange $5^c$ extending around the exterior of the open end of the connector, serving to produce a tight closure between the connector and its cap.

The connector may be attached to a pipe used as a conduit for electric conductors by screwing them together, and the channel like conduit is connected with the connector by placing the end of the conduit in socket 2, and after the conductor is properly located within the pipe, connector and conduit, cap 5 may be secured in place over the open portion of the connector. With the connector shown the channel-like conduit and the pipe are firmly united together and maintained in bond-like connection while they extend at an angle to each other, whereby where a system of electrical distribution is already installed comprising piping and it is desired to carry off a branch by means of an open-sided conduit, or vice versa, proper connection can be readily made one with the other, or an original installation may be made in the manner shown.

Having now described my invention what I claim is:—

1. A connector comprising a piece of material having a plurality of branches at an angle to each other, one of said branches being tubular and provided with internal screw threads, the other branch having a socket opening in two directions, one of said directions being at an angle to the bore of said tubular branch, said connector having a chamber communicating with said tubular branch and with said socket.

2. A connector comprising a single piece of material having a plurality of branches located at an angle to each other, one of said branches being tubular and provided with internal screw threads and with a seat at the inner part of its bore, the other branch having a socket having two sides open and facing in different directions, one of said directions being at an angle to the axis of the tubular branch, and the other of said directions being in the plane of said axis, said connector being provided with an internal chamber communicating with said branch and with said socket.

3. A connector comprising a single piece of material having a plurality of branches at an angle to each other, one of said branches being tubular and provided with internal screw threads and with a seat at the inner part of its bore, the other branch having a socket having two sides open and facing in different directions, said connector being provided with an internal chamber communicating with said branch and with said socket, and a cap secured upon the connector over one open side of the socket and over said chamber.

4. The combination of a tubular pipe provided with threads at its end, a connector having a plurality of branches, one of said branches being tubular and provided with threads receiving the threads of said pipe, the other branch being provided with a socket and having a side opening at an angle to said pipe, and a channel-like conduit received in said socket, said conduit being provided with a removable cover.

5. The combination of a tubular pipe provided with threads at its end, a connector having a plurality of branches, one of said branches being tubular and provided with threads receiving the threads of said pipe, the other branch being provided with a socket and having a side opening at an angle to said pipe, a channel-like conduit received in said socket, said conduit being provided with a removable cover, said connector having an internal chamber communicating with the tubular branch and with said socket, and a cover secured over said socket and chamber.

Signed at New York city, in the county of New York, and State of New York, this 22nd day of September, A. D. 1909.

GEORGE A. LUTZ.

Witnesses:
RALPH E. ROBERTS,
T. F. BOURNE.